United States Patent
Ziegler et al.

(10) Patent No.: US 8,590,104 B2
(45) Date of Patent: Nov. 26, 2013

(54) BUSHING-TYPE COMPONENT AND INTERFERENCE FIT FORMED WITH THIS COMPONENT

(75) Inventors: Andreas Ziegler, Nuremberg (DE); Alexander Pabst, Erlangen (DE); Frank Beeck, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 108 days.

(21) Appl. No.: 13/157,946

(22) Filed: Jun. 10, 2011

(65) Prior Publication Data

US 2012/0246867 A1 Oct. 4, 2012

(30) Foreign Application Priority Data

Mar. 29, 2011 (DE) .................. 10 2011 006 293

(51) Int. Cl.
*F16L 5/00* (2006.01)
(52) U.S. Cl.
USPC ............................ 16/2.1; 384/286; 384/295
(58) Field of Classification Search
USPC .............. 16/2.1–2.5; 384/276, 280, 281, 286, 384/295, 428, 585
See application file for complete search history.

(56) References Cited

U.S. PATENT DOCUMENTS

| | | | | |
|---|---|---|---|---|
| 3,252,742 A | * | 5/1966 | Swanstrom | 384/206 |
| 3,349,649 A | * | 10/1967 | Mele | 408/241 R |
| 4,117,917 A | * | 10/1978 | Ladin et al. | 192/98 |
| 4,534,458 A | * | 8/1985 | Ladin | 192/98 |
| 6,056,446 A | * | 5/2000 | Welter et al. | 384/607 |
| 6,238,096 B1 | * | 5/2001 | Allen et al. | 384/495 |
| 6,601,271 B1 | * | 8/2003 | Sommerfeld et al. | 16/427 |
| 6,849,803 B1 | * | 2/2005 | Gretz | 174/665 |
| 2010/0014798 A1 | * | 1/2010 | Fischer et al. | 384/585 |
| 2010/0021263 A1 | * | 1/2010 | Holt et al. | 411/107 |

FOREIGN PATENT DOCUMENTS

DE 102007048124 * 4/2009
EP 597438 A1 * 5/1994

* cited by examiner

*Primary Examiner* — William Miller
(74) *Attorney, Agent, or Firm* — Lucas & Mercanti, LLP (57) ABSTRACT

The invention concerns an interference fit comprising a carrier and at least one stepped bushing seated with an interference fit on the carrier. The stepped bushing is made by shaping a sheet metal and is characterized by a special wall thickness configuration. Through this wall thickness configuration, it becomes possible to assure that the stepped bushing conforms to close shape tolerances in the pressed-in state in regions of functional relevance.

9 Claims, 5 Drawing Sheets

BUSHING-TYPE COMPONENT AND INTERFERENCE FIT FORMED WITH THIS COMPONENT

This application claims the priority of DE 10 2011 006 293.9 filed Mar. 29, 2011.

FIELD OF THE INVENTION

The invention concerns an interference fit comprising a carrier and at least one bushing-type component seated with an interference fit on the carrier, said bushing-type component being made by shaping out of a sheet metal, at least one depression being configured in a seating surface formed by the carrier, which seating surface is at least partially covered by at least one wall section of the bushing-type component. The invention further concerns a bushing-type component for the interference fit and a medium guide in a transmission in which an interference fit exists between the carrier and the bushing-type component.

BACKGROUND OF THE INVENTION

Interference fits of the pre-cited type between relatively thick-walled carriers and thin-walled bushing-type components made of sheet metal are used in machine construction and automotive vehicle construction, particularly in mechanical systems with complex design space conditions. Such bushing-type components make it possible to provide, at low costs, separating walls and mechanically high-grade surfaces particularly suitable for use as running surfaces.

Examples of use are bearing rings for needle roller bearings or cylindrical roller bearings that are drawn out of sheet metal and can be used without a finishing treatment of the rolling contact surfaces. Further examples are sealing surfaces that are formed by the surface of bushings after they have been drawn.

Through the interference connection between the carrier and the bushing, channels, for example, for medium guides can be formed by the fact that e.g., grooves in the surface of the carriers are covered with help of the thin-walled component, so that channels delimited on all sides get formed. Through such an arrangement, it becomes possible to dispense with high cost fabrication technology and the problematic mechanical structure configuration of long lubrication channels in solid material.

Bearing rings of radial rolling bearings and sealing bushings, as already mentioned, are bushing-type thin-walled components of sheet metal whose thin walls advantageously enable the radial design height to be kept at a low level. Such thin-walled components are made economically preferably by cold shaping, particularly by deep drawing out of sheet metal. As individual parts, thin-walled bearing rings are often comparatively non-circular in shape. They therefore have to be pressed into or onto the bearing seat of the carrier, so that they can assume the roundness required for rolling bearings. In addition, with the interference fit, the optimal radial bearing clearance and the firm seating of the respective bearing ring are achieved.

The respective cylindrical seating for the bearing ring or for the sealing bushing comprises, for reasons of functionality and fabrication, depressions on the surface of the carrier which are formed, for example, by openings of guides and channels for fluid or gaseous mediums or by any other reception-like depressions. In so far as the pressing-in forces for the interference fit are relatively high, it is possible for the rings to get upset and yield radially into the depressions. As a result, the rings get deformed particularly in the region of the depressions so that they assume a non-circular shape.

Due to the absence of radial support in the region of the depressions, the sheet metal of the wall sections with which the groove-shaped or opening-shaped depressions are covered, yields radially outwards when it is pressed in and radially inwards into the depressions when it is pressed on. Moreover, due to the stresses out of the interference fit, the components grip or undergo an equalizing displacement into the depressions. The contours of the channels change in such a way that non-circularities and other undesired shape deviations occur, so that piston running surfaces and sealing surfaces become non-circular and rolling contact surfaces inexact.

In such arrangements, therefore, an interference fit of the bushing-type components with the carriers is not used. This, however, also means that the non-circularities occurring in the bearing and on the sealing seats, as well as larger operational lashes are accepted. The components are then secured, for example, with the help of tabs on the corresponding seats as proposed, for example, in DE 10 2007 048 124 A1.

Thin-walled bushings are used, for example, as sealing bushings in transmissions comprising, inter-inserted shaft systems such as in converter transmissions or double clutch transmissions. These bushings seal oil-conveying structures, close fabrication-related openings or are used for a controlled supply of lubricating oil. Bushings of this type are frequently pressed into cylindrical bores of hollow shafts. In this case, a person skilled in the art is confronted with the problems described above. Deformations and faults occur in the region of depressions, for example on the sealed seats and can lead to losses due to leaks in these medium guides.

DE 42 38 147 A1 shows such medium guides in an automated transmission that are delimited by bearing rings of two rolling bearings and are formed on the surroundings of these. Each of the oil guides conveys pressure oil to one piston/cylinder unit of a hydraulically actuated clutch. Through the rolling bearings, a carrier of the hushing-type component, designated as a hollow cylindrical shaft section of a planetary transmission, is mounted for rotation in housing sections of hydraulic clutches of the automated transmission.

The first rolling bearing comprises an inner bearing ring and an outer bearing ring, both of which are configured as hollow cylindrical bushing-type components between which the rolling elements roll on rolling surfaces. The carrier for the inner bearing ring is a hollow cylindrical section of the housing of the first piston/cylinder unit of one of the hydraulically actuated clutches. The carrier for the outer bearing ring is a shaft section in whose inner cylindrical hole the bearing ring is seated and with which the hearing ring can rotate about an axis of rotation.

The second rolling bearing comprises an inner and an outer bearing ring with raceways for the roiling elements, both bearing rings being configured as bushing-type components. The inner bearing ring carrier which is rotatable about the axis of rotation is the cylindrical shaft section of the planetary drive. The carrier of the outer bearing ring is a housing of the second piston/cylinder unit of one of the hydraulically actuated clutches, the carrier being seated in the cylindrical bore of the housing.

The inner and outer bearing rings are likewise configured as sealing bushings and oil guiding elements and, in addition, they comprise sealing surfaces as well as the rolling surfaces for rolling elements. Pressure oil is guided via the channels in the hollow cylindrical shaft section at first to the outer bearing ring of the first rolling bearing and to the inner bearing ring of the second rolling bearing. The channels bear against the outer bearing ring of the first rolling bearing and against the inner bearing ring of the second rolling bearing.

The outer bearing ring of the first rolling bearing comprises a radial through-aperture that communicates for oil transfer with one of the channels of a first oil guide. Through this aperture, oil can flow out of the channel into the interior of the first bearing to the inner bearing ring. The inner bearing ring likewise comprises a radial through-aperture that communicates with a further channel of the first oil guide for oil transfer in direction of the first piston/cylinder unit.

The inner bearing ring of the second rolling bearing closes the channel of the first oil guide, so that no oil can flow out of the first oil guide into the second rolling bearing. However, the inner bearing ring of the second rolling bearing comprises a radial through-aperture that communicates for oil transfer with a channel of a second oil guide. Further, the outer bearing ring of the second rolling bearing comprises a radial through-aperture that communicates for oil transfer with a further channel of the second oil guide which leads to the second piston/cylinder unit.

Both the first rolling bearing and the second rolling bearing are sealed laterally from the surroundings, so that hardly any pressure oil can escape from the rolling bearings to the surroundings. For this purpose, the outer bearing ring of each of the rolling bearings comprises sealing surfaces against each of which a sealing ring bears.

SUMMARY OF THE INVENTION

The object of the invention is to provide an interference fit, as also bushings for interference fits of the pre-cited type and thus create realized medium guides with which the aforesaid problems can be avoided.

This object is achieved by the invention with an interference fit comprising a carrier and at least one bushing-type component made of sheet metal and seated with an interference fit on the carrier, at least one depression being configured on the surface of the carrier and at least partially covered by at least one wall section of the bushing-type component, wherein:
  the thickness of the sheet metal of the wall section by which the depression is covered at least partially is larger than a thickness of the sheet metal of the bushing-type component that directly adjoins the wall section in at least one direction and with which the bushing-type component forms the interference fit with the carrier in the surrounding of the depression,
  the bushing-type component comprises a first cylindrical wall section and a second cylindrical wall section,
  the first cylindrical wall section has a larger outer diameter than the second cylindrical wall section, and
  an annular shoulder section is configured in an intermediate region between the first cylindrical wall section and the second cylindrical wall section.

The invention concerns interference fits in all fields of mechanical engineering and automobile engineering in which the precision of the interference fits of thin-walled bushing-type components is influenced by depressions on the surface of carriers. The invention further concerns medium guides in all kinds of industrial machines and particularly in automotive vehicle transmissions. By medium guides are to be understood, in the widest sense, all channels and holes that are suitable for conveying, transmitting or absorbing non-pressurized or pressurized mediums like air or oil. The invention also concerns the bushing-type components for said interference fits.

The interference fit is formed between the carrier and at least one one-piece or composite bushing-type component with a respective structurally required shape and appropriate cross-sections and dimensions. The bushing-type component, however, is preferably configured as a cylindrical bushing comprising at least one stepped taper.

Carriers are components comprising a seating surface formed by an inner wall, or an outer wall in or on which the bushing-type, thin-walled component is seated. The carriers are, for example, shafts, hollow shafts, shaft butt ends and other rotationally symmetric components. The carriers are made preferably out of steel or aluminum and appropriate alloys.

The bushing-type component is seated in or on a carrier. At least one depression is configured as a groove or a through-aperture or a pocket hole on the carrier. The channel can be, for example, a groove extending aligned to or at any inclination to the longitudinal axis of the carrier on the surface, in a bore or in the outer shell. It is also conceivable for the groove to be an annular groove extending about the axis of rotation of a rotationally symmetrical carrier. Alternatively, the channel is formed by a depression or a transvers bore. A channel gets formed between the carrier and the bushing-type component due to the fact that a groove or a hole on the surface of the carrier is at least partially covered by the bushing-type component.

The bushing-type component and the carrier are seated at least on the surroundings of the channel in an interference fit with each other. The thickness of the sheet metal of the wall section with which the channel is covered is larger than the thickness of the sheet metal of the bushing that adjoins the wall section directly at least in one direction and with which the bushing-type component forms the interference fit with the carrier.

The bushing-type components have a respective structurally required shape. In one development of the invention, the bushing-type component has a hollow cylindrical configuration and is open at the ends or is closed at one end. The bushing-type components are optionally pressed into or onto the carrier. The wall sections of the bushing-type components close the depressions partially or completely and can also comprise a hole or a plurality of holes, so that the bushing-type component makes the depressions accessible, for example, for oil. The surface of the bushing-type components forms in its entirety or in parts, sealing surfaces against which seals bear or run, or rolling surfaces on which the rolling elements roll. Alternatively, the bushing-type components themselves can close or seal.

The bushing-type components are drawn preferably out of sheet steel with a substantially uniform wall thickness. However, according to the invention, on the wall section with which depressions are covered or are intended to be covered, the thickness of the drawn sheet metal is larger than in the rest of the axial or peripheral regions that are directly adjacent to the wall section. The transition between the thickened region and the thinner-walled region can be made in form of a flat ramp or be rounded or configured as chamfer-forming inclined surfaces. The wall thickness in the thickened region can also vary. Thus, the larger the distance from the regions supported radially by the interference fit, the larger can be the thickness of the wall in the zones that are not supported in radial direction.

The wall section protrudes on the not yet assembled bushing-type component by the measure of the thicker wall thickness beyond its surroundings either on the outside or on the inside, or only on the outside or only on the inside, beyond the surface destined for the interference fit or the surface turned away from the interference fit. Preferably, the wall section protrudes with the fractional part of the thicker sheet metal thickness from the back side of the wall of the bushing-type component that is in contact with the carrier through the interference fit.

The wall thickness, i.e. the thickness of the bushing-type components lies preferably between 0.5 and 2.5 mm. The fractional part by which the thickness of the sheet metal of the wall section is larger than the thickness of the adjoining regions of the component lie advantageously between 5% and 20%, preferably between 5% and 10% of the sheet metal thickness of the adjoining regions. The wall section can either comprise a completely closed surface or local through-apertures, particularly through-holes. The protruding fractional part does indeed form an undercut during the drawing step of the bushing-type component in direction of removal from the mold. However, due to small dimensions, this undercut deflects during removal and yields elastically into its original position.

If, for example, the bushing-type component has a hollow cylindrical configuration, the bushing receives a desired non-circular shape due to the protruding fractional part/protruding fractional parts of the sheet metal of the wall section in these regions. The hushing-type component is pressed on or in with an appropriate directional orientation, so that, in the end position of the component, the wall section covers the corresponding depression as intended. As described in the paragraph "Background of the invention", in the region of the depression, the bushing-type component yields partially into the depression, so that a radial part of the sheet metal of the wall section sinks into the depression. For this reason, the sheet metal of the wall section is specifically designed to be thicker by that measure by which the wall section normally yields into the depression. The component, made as an individual component, is purposefully configured with a shape deviation realized through the protruding fractional part, so that, in the pressed-in or pressed-on state on the back side of its wall which is situated in the interference fit, the component possesses the required exactness because the protruding part has then yielded into the depression. Sealing seats, running surfaces and further functional surfaces thus achieve close shape tolerances.

Through the use of a bushing according to the invention, the interference fit can be realized without high costs. The surrounding structure of the bushing-type component can remain unchanged. The bushing according to the invention can replace prior art bushings without any problem.

BRIEF DESCRIPTION OF THE FIGURES

Further details and features of the invention will become obvious from the following description with reference to the appended drawing. The figures show.

Figure 1:
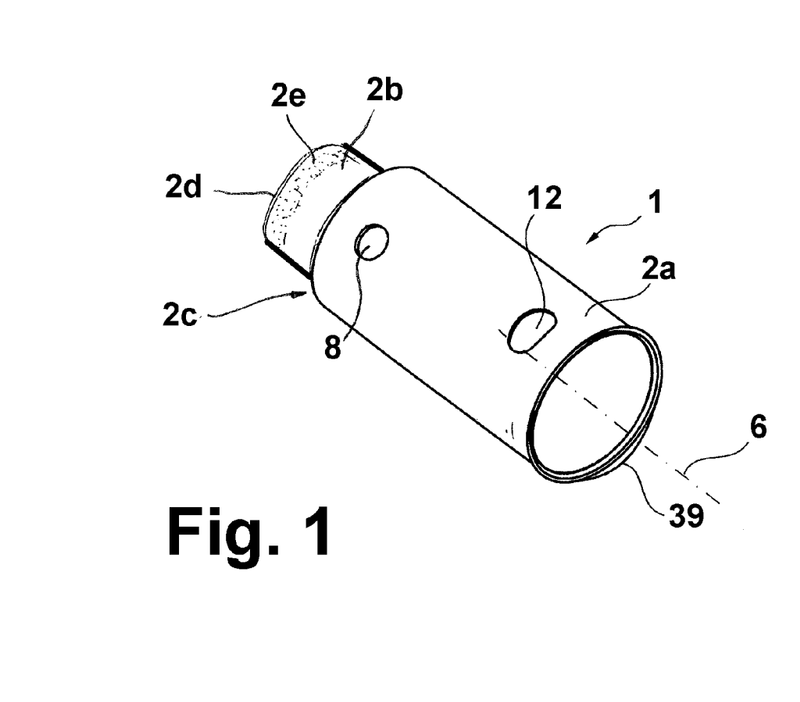
FIG. 1, a perspective illustration of a stepped bushing according to the invention with a locally increased radial wall thickness.
Figure 9:
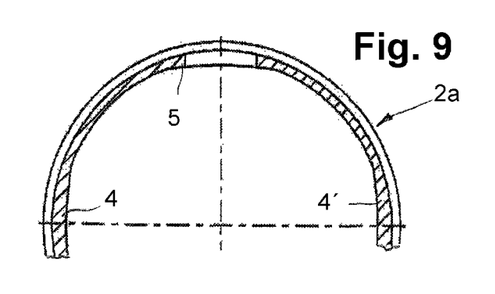

FIG. 9, a fifth detail sectional view for illustrating the wall thickness configuration of a stepped bushing according to the invention The stepped bushing 1 according to the invention shown in FIG. 1 is made out of a sheet material. This stepped bushing 1 comprises a first cylindrical wall section 2a and a second cylindrical wall section 2b. The first cylindrical wall section 2a has a larger outer diameter than the second cylindrical wall section 2b. The two cylindrical wall sections 2a, 2b are connected to each other by an annular shoulder section 2c and, on the whole, are arranged relative to each other so as to be concentric to an axis of rotation 6. Both the first cylindrical wall section 2a and the second cylindrical wall section 2b are dimensioned so that, in the installed position explained in more detail below, their outer surfaces function, at least in parts, as pressure surfaces through which the stepped bushing is loaded in radial direction.

In the region of its end region turned away from the annular shoulder section 2c, the second cylindrical wall section 2b comprises a rounded portion 2d. This rounded portion forms a radially inwards protruding collar. The rounded portion 2c facilitates the pressing-in of the stepped bushing and additionally stiffens the second cylindrical wall section 2b.

A plurality of apertures is arranged in the region of the first cylindrical wall section 2a. One of these apertures is configured as an oblong hole 12, a further aperture, axially spaced from the one aperture and offset from this in peripheral direction functions as a through-hole 11 and has a substantially circular cross-section.

A tab 39 is configured on the first cylindrical wall section 2a in the region of its end region turned away from the annular shoulder section 2c. Through this tab 39 in combination with a corresponding complementary geometry, it becomes possible to define the position of the stepped bushing 1 in peripheral direction.

The second cylindrical wall section 2b is configured so that, in the pressed-in state, a part of the region of the second cylindrical wall section 2b spaced from the annular shoulder section 2c generates a clearly higher radial surface pressure than the remaining region of the second cylindrical wall section 2b. For this purpose, an annular region, indicated by dots and adjoining the rounded portion 2d, forms a fractional surface 2e of the interference fit. This local raising of the surface pressure in this annular region is obtained by the fact that compared to the remaining region of the second cylindrical wall section 2b, this region possesses an oversize which leads to an interference fit. The adjoining annular zone of the second cylindrical wall section 2b in axial direction has a smaller outer diameter. The second cylindrical wall section 2b is preferably configured so that the length of the interference fit fractional surface 2e measured in axial direction is approximately 30% to 50% of the axial length of the second cylindrical wall section 2b. It is possible to configure in the inner region of the rounded portion 2d, a relatively sharp inner edge which can be engaged by an annular end face of a pressing-in die. The pressing-in of the stepped bushing 1 into a bore is realized preferably by introducing the pressing-in force into the inner edge region of the rounded portion 2d as well as into the inner edge region of the annular shoulder section 2c. Thus, during pressing-in, the stepped bushing 1 is subjected primarily to tension loading in the region of the first cylindrical wall section 2a, so that it is not bellied by the pressing-in forces.

Figure 2:
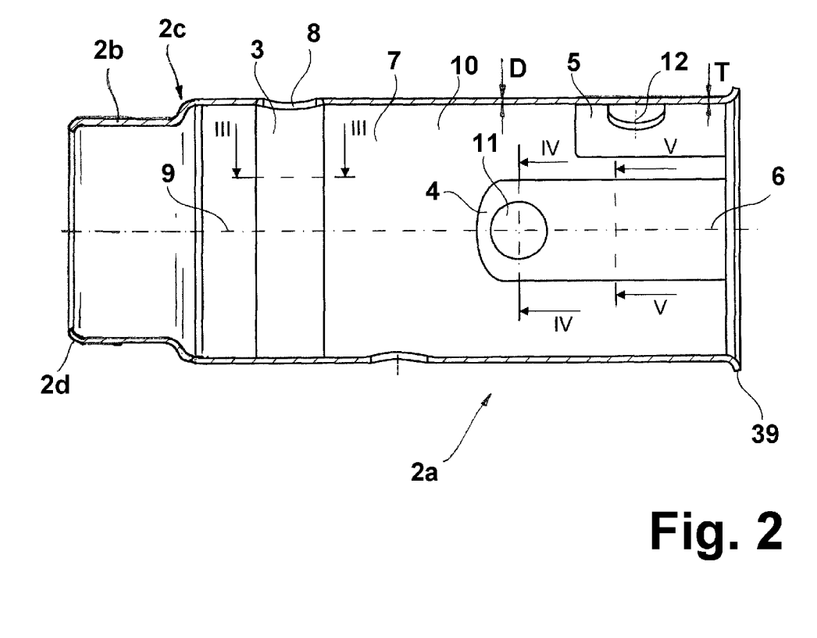
FIG. 2, an axial cross-sectional view for illustrating and elucidating further details and features of the stepped bushing according to the invention.

For the further description of the geometry of the stepped bushing 1 according to the invention, reference will be made in the following alternately to FIGS. 2 to 5. FIG. 2 shows the stepped bushing 1 of the invention according to FIG. 1 in a longitudinal section along the axis of rotation 6. The cylindrical wall section 2a comprises wall sections 3, 4 and 5 that differ in thickness from the rest of the wall of the stepped bushing 1 with respect to the wall thickness "T" that is larger than the wall thickness "D" of the rest of the wall of the first cylindrical wall section 2a. In these zones of locally increased wall thickness are situated the through-apertures 8, 11, 12.

The stepped bushing 1 comprises in the region of the second cylindrical wall section 2b a smaller outer diameter than in the region of the first cylindrical wall section 2a. The transition from the second cylindrical wall section 2b to the first cylindrical wall section 2a is accomplished through the annular shoulder section 2c. The two cylindrical wall sections 2a, 2b are radially stiffened through the annular shoulder section 2c. Further, the annular shoulder section 2c can form a channel-defining wall which, together with the adjoining region of the second cylindrical wall section 2b defines a channel. In this connection, particular reference is made to the channel 40 shown in FIG. 6.

In its front end region turned away from the annular shoulder section 2c the second cylindrical wall section 2b comprises a rounded portion 2d. This rounded portion facilitates the pressing-in of the stepped bushing 1 into a corresponding reception bore. Moreover, the front end region of the second cylindrical wall section 2b is stiffened through this rounded portion. It is possible to match the dimensions of the second cylindrical wall section 2b and of a bore provided for receiving the second cylindrical wall section 2b such that already through the interference fit realized in the region of the second cylindrical wall section 2b, a large anchoring contribution is made to securing the stepped bushing 1. The axial length of the second cylindrical wall section 2b measured in direction of the bushing axis 6 is substantially smaller than the axial length of the first cylindrical wall section 2a and is situated preferably in the range of 10% to 25% of the length of the first cylindrical wall section 2a. The diameter reduction of the second cylindrical wall section 2b compared to the first cylindrical wall section 2a is preferably situated between 5% and 30%. The stepped bushing 1 can also comprise further steps.

Figures 3, 4:
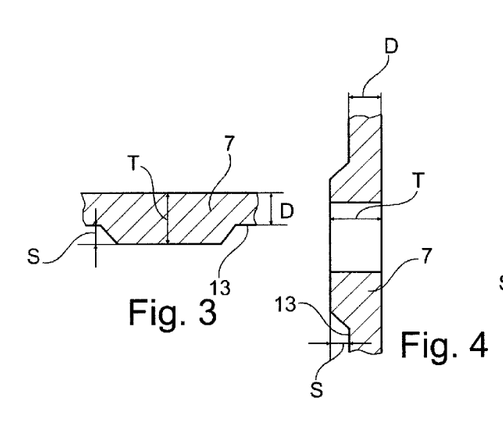
FIG. 3, a first detail sectional view along section plane III-III shown in FIG. 2 for illustrating a zone comprising a locally increased wall thickness.
FIG. 4, a second detail sectional view along section plane IV-IV shown in FIG. 2.
Figure 5:
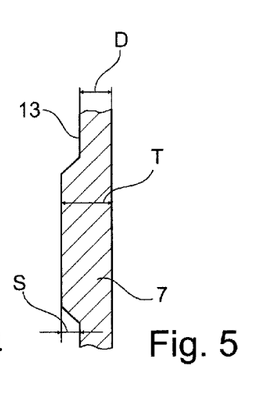
FIG. 5, a third detail sectional view along section plane V-V shown in FIG. 2.

FIGS. 3, 4 and 5 show not-to-scale, exaggeratedly large sectional illustrations through the respective wall sections 3, 4 and 5 and their surroundings along respective sectional lines III-III, IV-IV and V-V. The wall thickness "T" of the sheet metal of the respective wall section 3, 4 and 5 is larger in each case by the amount "S" than the thickness "D" of the sheet metal of the rest of the wall 7 of the stepped bushing 1 directly adjoining each respective wall section.

The wall section 3 with the thickness "T" extends like an endless strip continuously in peripheral direction about the axis of rotation 6. The sections 9 and 10 of the rest of the wall 7 with the thickness "D" of the stepped bushing 1 adjoin the wall section 3 axially in both directions. A through-hole 8 is configured in the ring-like continuously extending, radially thickened wall section 3.

The wall section 4 with the thickness "T" which can also be thicker or thinner than the thickness of the sheet metal on the wall section 3 is configured in a strip shape and oriented longitudinally to the axis of rotation 6. The section 10 of the rest of the wall of the stepped bushing 1 adjoins the wall section 4 on both sides in peripheral direction about the axis of rotation 6 and in one axial direction. A through-hole 11 is configured in the wall section 4.

The wall section 5 with the thickness "T" which can also be thicker or thinner than the thickness of the sheet metal on the wall section 3 and 4 is configured in a strip shape and oriented longitudinally to the axis of rotation 6. The section 10 of the rest of the wall 7 of the stepped bushing 1 adjoins the wall section 5 on both sides in peripheral direction about the axis of rotation 6 and in one axial direction. An oblong hole 12 is configured in the wall section 5.

Figure 6:
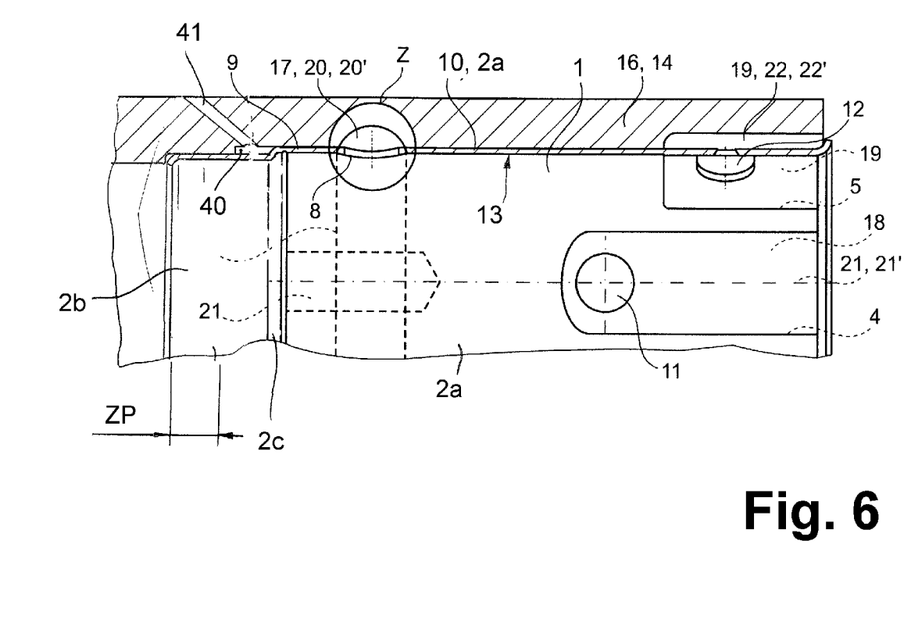
FIG. 6, an axial cross-sectional view for illustrating the structure of an interference fit realized with inclusion of the bushing according to the invention, wherein channel caverns are covered by the locally thickened bushing wall.

The fractional part "S" by which the thickness "T" of the sheet metal on the wall sections 3, 4 and 5 is thicker than the thickness "D" of the rest of the wall sections 9 and 10 protrudes from the back side 13 of the wall of the stepped bushing 1 which is destined for an interference fit with a hollow shaft 14 in a bore 15 (FIG. 6). Because the stepped bushing 1 is pressed in, the back side is formed by the inner side. If, on the contrary, a bushing is to be pressed on, the back side would be the outer side of a bushing. The stepped bushing 1 further comprises a tab 39 which enables a correctly oriented assembly of the sections 3, 4 and 5 comprising the holes 8, 11 and 12 with respect to a carrier 16 in an interference fit shown in FIG. 6.

FIG. 6 shows an interference fit according to the invention comprising a carrier 16 in the form of the hollow shaft 14 and the thin-walled, sheet metal stepped bushing 1 seated in the carrier 16 in an interference fit. In the region of the inner wall of the carrier 16 are configured depressions 17, 18 and 19 which are covered in radial direction each one by a respective wall section 3, 4 or 5 of the stepped bushing 1.

The second cylindrical wall section 2b has a smaller outer diameter than the first cylindrical wall section 2a. The carrier 16 is configured so as to form together with the second cylindrical wall section 2b and the outer wall of the annular shoulder 2c, a channel 40. This channel 40 communicates with a fluid channel 41 extending in the carrier 16. The outer dimension of the second cylindrical wall 2 is matched to the inner dimension of the corresponding bore of the carrier 16, so that the second cylindrical wall section 2b is subjected to a higher surface pressure in the axial region ZP than in the adjoining region extending up to the annular shoulder 2c.

The depression 17 is configured as an annular groove 20 which, in the shown installation of the stepped bushing 1, is covered by the wall section 3, so that the annular groove 20 and the wall section 3 define an annular channel 20'. The annular channel 20' is connected to a longitudinally directed channel 21 in form of a pocket bore. The annular channel 20' is further accessible through the hole 8. An interference fit is formed between the stepped bushing 1 and the carrier 16 on the wall sections 9 and 10 on both sides of the annular groove 20.

The depression 18 is a longitudinal groove 21 that is covered by the wall section 4, so that a channel 21' is defined by the longitudinal groove 21 and the wall section 4. The channel 21' is accessible through the through-hole 11. An interference fit is formed between the stepped bushing 1 and the carrier 16 on the wall section 4 on both sides in peripheral direction and on one end side in axial direction.

The depression 19 is a longitudinal groove 22 that is covered by the wall section 5, so that a channel 22' is defined by the longitudinal groove 22 and the wall section 5. The channel 22' is accessible through the oblong hole 12. An interference fit is formed between the stepped bushing 1 and the carrier 16 on the wall section 10 on both sides in peripheral direction and on one end side in axial direction.

Figure 7:
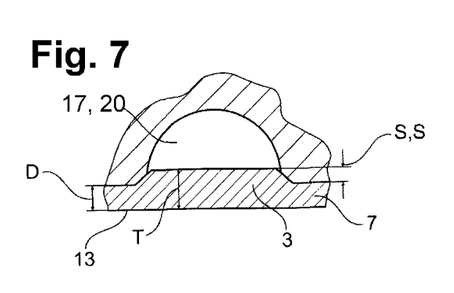
FIG. 7, a fourth detail sectional view for illustrating the covering of a peripheral cavern through a locally thickened cylindrical wall of the stepped hushing according to the invention matched to the cavern contour.
Figure 8:
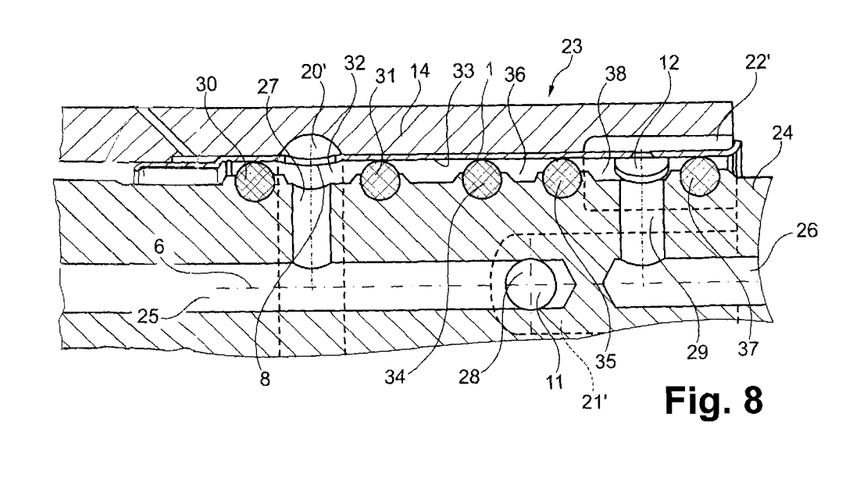
FIG. 8, an axial cross-sectional view for illustrating the installed situation of a stepped bushing according to the invention in a transmission, a transmission shaft being seated in the inner region of the stepped bushing according to the invention, said bushing being retained on the outside by an interference fit, and the transmission shaft comprising sealing rings which run on an inner surface formed by the stepped bushing according to the invention.

The fractional part "S" by which the thickness "T" of the sheet metal on the wall sections 3, 4 and 5 is thicker than the thickness "D" of the rest of the wall sections 9 and 10 no longer protrudes from the back side 13 of the wall of the stepped bushing 1 when this has been pressed in but it is sunk as a fractional part "SS" into the respective depression 17, 18 or 19 as disclosed by way of example in FIG. 7, a section along line VII-VII in a not-to-scale, exaggeratedly enlarged illustration. The thickness "T" of the sheet metal of the respective wall section 3, 4 or 5 is larger by the measure "SS" than the thickness "D" of the sheet metal of the rest of the wall. The measure "SS" may, but must not correspond to the original measure "S":

FIG. 7 shows a medium guide 23 for a transmission, not specifically shown, in a partial section along the axis of rotation 6. An insert shaft 24 is inserted into the hollow shaft 14. The insert shaft 24 comprises various feed channels 25 and 26 with transverse channels 27, 28 and 29. The entire inner side of the bushing-type component is a sealing surface 33 for seals in form of O-rings 30, 31, 34, 35 and 37.

The O-rings 30 and 31 seal an annular space 32 and bear against a sealing surface 33 of the stepped bushing 1. The annular channel 20' and the annular space 32 are connected to each other through the bore 8 and are supplied with oil via the transverse channel 27 which branches off the feed channel 25. The O-rings 30, 31, 34, 35 and 37 are represented here only by way of example as O-rings. In respect of their cross-section, these rings may also be differently configured, particularly as rectangular rings or as rings with a plurality of sealing lips or disks.

The O-rings 34 and 35 seal an annular space 36 between the stepped bushing 1 and the insert shaft 24 and bear for this purpose against the sealing surface 33 formed by the inner surface of the stepped bushing. The annular space 36 is connected to the channel 21' through the through-hole 11 and is supplied with oil via the transverse channel 28 which branches off the feed channel 25.

The O-rings 35 and 37 seal an annular space 38 between the stepped bushing 1 and the insert shaft 24 and bear for this purpose against the sealing surface 33. The annular space 38 is connected to the channel 22' through the oblong hole 12 and is supplied with oil via the transverse channel 29 which branches off the feed channel 26.

A preferred configuration of the cross-section of the stepped bushing 1 in the region of the first cylindrical wall section is illustrated in FIG. 9 in a detail radial sectional view. In the present example of embodiment illustrated here, there exists in the non-pressed state, at first, a certain non-circularity in the region of the inner wall of the stepped bushing which is due to the particular wall thickness configuration. Due to the deformation which occurs in the inner region of the first cylindrical wall section during installation of the stepped bushing, a cylindrical surface whose roundness meets requirements of close shape tolerances is obtained in the installed state. Suitable wall thickness patterns can be determined with help of structural-mechanical calculations, particularly by FEM calculations. It is also possible to arrive at this special wall thickness configuration through empirical methods. Thus, it is possible to determine suitable wall thicknesses in that a thin-walled bushing is at first pressed-in by way of experiment and the obtained non-circularities are measured. The additions of material required for compensating these non-circularities can then be determined out of these non-circularities and applied to a drawing tool or a core die.

The transition configured in the cylindrical wall section 2a between the thinner-walled zones that are subjected to radial pressure from the interference fit and the thickened zones 4, 4' and 5 that serve as coverings are smooth and have relatively small gradients.

The invention claimed is:

1. An assembly, comprising:
   a carrier having a surface with at least one depression configured on the surface; and
   at least one bushing component, which is made of sheet metal and seated with an interference fit on the carrier, having at least one wall section that at least partially covers the depression, the at least one bushing component further including a first cylindrical wall section and a second cylindrical wall section, the first cylindrical wall section has a larger outer diameter than the second cylindrical wall section, and an annular shoulder section configured in an intermediate region between the first cylindrical wall section and the second cylindrical wall section,
   wherein a thickness of the sheet metal of the wall section that at least partially covers the depression is larger than a thickness of the sheet metal of the bushing component that directly adjoins the wall section in at least one direction such that the bushing component forms the interference fit with the carrier in surroundings of the depression.

2. The assembly according to claim 1, wherein the bushing component has a hollow cylindrical configuration.

3. The assembly according to claim 1, wherein the bushing component is pressed into the carrier.

4. The assembly according to claim 1 wherein the wall section comprises at least one hole that leads into the depression and communicates for oil transfer with the depression.

5. The assembly according to claim 1 wherein the wall section comprises a sealing surface against which at least one seal bears.

6. The assembly according to claim 1, wherein the bushing component and the carrier are seated on each other with the interference fit in the surroundings of the depression, and the wall section surrounds the depression.

7. A medium guide in a transmission, comprising:
   a carrier having at least one depression configured on a surface of the carrier;
   at least one bushing component, which is made of sheet metal and seated with an interference fit on the carrier, having at least one wall section comprised of a first cylindrical wall section and a second cylindrical wall section, the first cylindrical wall section has a larger outer diameter than the second cylindrical wall section, and an annular shoulder section configured in an intermediate region between the first cylindrical wall section and the second cylindrical wall section such that the bushing component is configured as a stepped component; and
   at least one channel formed between the carrier and the bushing component that is capable of guiding mediums, said channel being formed by the wall section of the bushing component and by the depression which is at least partially covered by the wall section,
   the carrier and the bushing component forming an interference fit with each other.

8. A bushing component made of sheet metal, comprising:
a first cylindrical wall section having a first diameter; and
a second cylindrical wall section having a second diameter that is smaller than the first diameter of the first cylindrical wall section, the first and second cylindrical wall sections being directed coaxially to an axis of rotation, and a radial sheet metal thickness of a first portion of at least one of the wall sections is made by cold shaping the sheet metal and is larger than a radial sheet metal thickness of a second portion of the at least one of the wall sections that adjoins the first portion in both axial directions that are aligned to the axis of rotation.

9. The bushing component according to claim 8, wherein the radial sheet metal thickness of the first portion is larger than the radial sheet metal thickness of the second portion that adjoins the first portion on both sides in peripheral directions oriented around the axis of rotation.

* * * * *